(12) United States Patent
Regester et al.

(10) Patent No.: US 9,946,484 B2
(45) Date of Patent: Apr. 17, 2018

(54) DYNAMIC ROUTING OF INPUT/OUTPUT REQUESTS IN ARRAY SYSTEMS

(71) Applicant: NetApp, Inc., Sunnyvale, CA (US)

(72) Inventors: Mark Regester, Wichita, KS (US); Randolph Sterns, Boulder, CO (US)

(73) Assignee: NetApp, Inc., Sunnyvale, CA (US)

( * ) Notice: Subject to any disclaimer, the term of this patent is extended or adjusted under 35 U.S.C. 154(b) by 332 days.

(21) Appl. No.: 14/815,581

(22) Filed: Jul. 31, 2015

(65) Prior Publication Data

US 2017/0031610 A1    Feb. 2, 2017

(51) Int. Cl.
*G06F 3/06* (2006.01)
*G06F 11/16* (2006.01)

(52) U.S. Cl.
CPC .......... *G06F 3/0635* (2013.01); *G06F 3/0613* (2013.01); *G06F 3/0689* (2013.01); *G06F 11/16* (2013.01)

(58) Field of Classification Search
CPC .... G06F 3/0635; G06F 3/0613; G06F 3/0689; G06F 11/16
See application file for complete search history.

(56) References Cited

U.S. PATENT DOCUMENTS

2008/0101236 A1* 5/2008 Miyamoto .............. H04L 45/22
370/235

* cited by examiner

*Primary Examiner* — Eric Cardwell
(74) *Attorney, Agent, or Firm* — Haynes and Boone, LLP

(57) ABSTRACT

A method includes: communicating input output (I/O) operations between a first storage controller and a storage drive, wherein the storage drive includes a first port and a second port, further wherein the first controller accesses the second port of the storage drive via a second storage controller; measuring bandwidth utilization on a first channel of a plurality of channels between the first storage controller and the storage drive; and in response to measuring the bandwidth utilization, changing a routing scheme for the I/O operations with respect to either the first port or the second port or both.

20 Claims, 4 Drawing Sheets

DYNAMIC ROUTING OF INPUT/OUTPUT REQUESTS IN ARRAY SYSTEMS

TECHNICAL FIELD

The present description relates to data storage and, more specifically, to systems, methods, and machine-readable media for dynamically changing routing for read and write operations based on bandwidth use in a storage system.

BACKGROUND

Some conventional storage systems include storage controllers arranged in a high availability (HA) pair to protect against failure of one of the controllers. An additional protection against failure and data loss is the use of mirroring operations. In one example mirroring operation, a first storage controller in the high availability pair performs a write operation to a first virtual volume and then sends a mirroring write operation to its high availability partner. The high availability partner then performs the mirroring write operation to a second virtual volume. The virtual volumes are implemented on physical storage drives.

In the example mirroring operation above, mirroring write operations compete with storage drive operations from the perspective of a given storage controller. Specifically, taking the first storage controller for example, it is responsible for performing read and write operations on behalf of hosts. The first storage controller is also responsible for performing mirroring for the write operations associated with its partner controller. The first storage controller has a finite number of channels to its storage drives and partner controller and a finite number of ports available in its storage drives and partner controller. In this way, storage drive read and write operations and mirroring operations compete for bandwidth on those finite number of channels. Also, when storage drive read and write operations are communicated on channels used by mirroring operations, in addition to bandwidth constraints, the storage drive operations may cause delay in completing the mirroring operations. Therefore, a given HA arrangement may be limited in the number of operations it can perform within a given period of time.

Accordingly, the potential remains for improvements that, for example, result in a storage system that may direct communications for read and write operations to more efficiently use available channels and storage drive ports.

BRIEF DESCRIPTION OF THE DRAWINGS

The present disclosure is best understood from the following detailed description when read with the accompanying figures.

DETAILED DESCRIPTION

Figure 1:
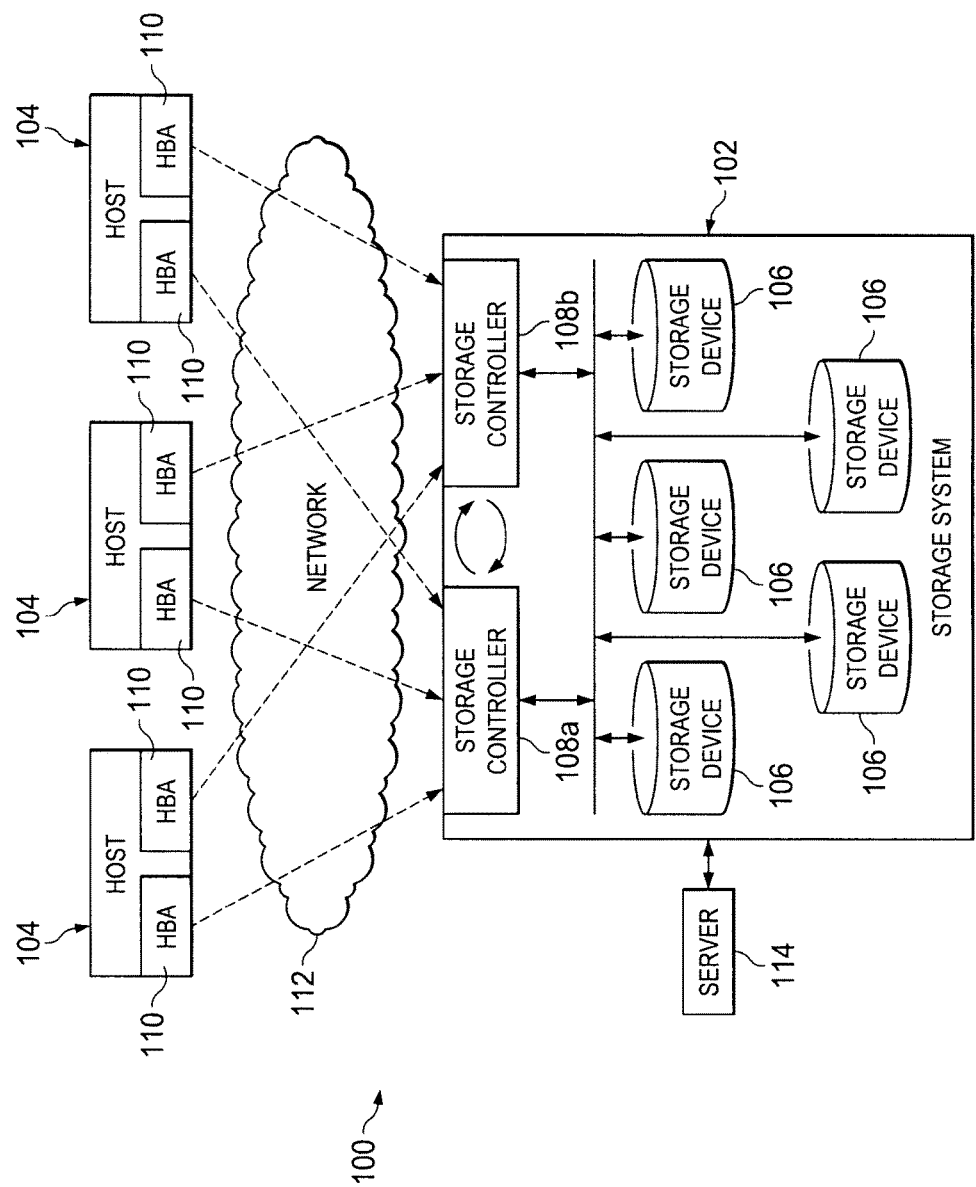
FIG. 1 is an organizational diagram of an exemplary data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for improving the operation of storage array systems by providing for dynamic routing changes for input and output operations communicated from a storage controller to one or more storage drives. One example storage controller includes two input output controllers, where a first input output controller is in communication with an expander and, via the expander, with a Side A port of a storage drive. The second input output controller is in communication with an expander of a high availability (HA) partner storage controller. Furthermore, the second input output controller is in communication with a Side B port of the storage drive via the HA partner storage controller.

The storage controller and its HA partner perform a mirroring operation, so that when the storage controller performs a write operation it also sends a mirroring input output (I/O) request to its HA partner. The storage controller sends the mirroring I/O request to its HA partner through the second input output controller. Of course, the HA partner storage controller also sends mirroring I/O requests to the first storage controller, and the first storage controller receives those mirroring I/O requests through the second input output controller. As a result, a communication channel between the second input output controller and the HA partner storage controller can be highly used, sometimes with no bandwidth to spare.

Thus, with respect to a given storage controller, there are at least two types of I/O operations. A first type includes operations performed by the storage controller itself to the storage drives. The second type includes mirroring operations that are routed to or from the storage controller. With respect to I/O operations to the storage drives by the storage controller (sometimes referred to herein as "storage drive I/O operations," as opposed to mirroring I/O operations), the storage controller can use the first input output controller to reach the Side A port of the storage drive. In some examples, the storage drive may operate more efficiently when both A and B ports are used. Therefore, it may be desirable for the storage controller to send some storage drive I/O operations to the Side B port as well using the second input output controller. However, when the storage controller uses the Side B port of the storage drive, the channel between the second input output controller and the HA partner storage controller may become crowded. Also, the additional traffic on that channel may cause some of the mirroring operations to be delayed.

Various embodiments described herein mitigate competition between storage drive I/O operations and mirroring I/O operations by employing dynamic routing of storage drive I/O operations. For instance, the storage controller monitors the traffic on a channel at an input output controller and compares the amount of traffic to a pre-programmed threshold. Traffic above the threshold indicates crowded channels, whereas traffic below the threshold indicates that bandwidth is available for mirroring and storage drive I/O operations. The default operation is for the storage controller to send storage drive I/O operations to both ports of the storage drive (Side A and Side B), thereby using available bandwidth of the channel between the second input output controller and the partner HA storage controller. However, if the storage controller determines that the traffic flow is above the threshold, it changes its routing scheme so that it ceases to send storage drive I/O operations using the second input output controller and thus sends storage drive I/O operations to Side A only. This change in routing reserves the channel at the second input output controller for mirroring traffic, thereby reducing delay of mirroring operations and increasing the total number of input output operations that may be performed at any given time period.

The storage controller continues to monitor traffic on the channel. If, after a time, the monitor traffic amount dips below the threshold, the storage controller changes the routing scheme again so that it returns to the default operation that includes sending storage drive I/O operations to Side A and Side B of the storage drive. During the default operating mode, there is enough bandwidth available that the channel between the second input output controller and the partner HA storage controller can handle mirroring I/O operation as well as the storage drive I/O operations to the Side B port. When this particular routing scheme is used, the efficiency of the storage drives themselves is increased, since both A and B ports are used.

The scope of embodiments is not limited to a single storage drive or two input output controllers. Rather, the principles described herein may be scaled for any appropriate HA architecture.

A data storage architecture 100, in which various embodiments may be implemented, is described with reference to FIG. 1. The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions (e.g., requests to read and/or write data) from one or more of the hosts 104, and take an action such as reading, writing, or otherwise accessing the requested data. For many exemplary transactions, the storage system 102 returns a response such as requested data and/or a status indictor to the requesting host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The instructions may, when executed by the processor, cause the processor to perform various operations described herein with the storage controllers 108.a, 108.b in the storage system 102 in connection with embodiments of the present disclosure. Instructions may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 and responds to one or more hosts 104's data transactions so that the storage devices 106 appear to be directly connected (local) to the hosts 104. In various examples, the storage devices 106 include hard disk drives (HDDs), solid state drives (SSDs), optical drives, and/or any other suitable volatile or non-volatile data storage medium. In some embodiments, the storage devices 106 are relatively homogeneous (e.g., having the same manufacturer, model, and/or configuration). However, it is also common for the storage system 102 to include a heterogeneous set of storage devices 106 that includes storage devices of different media types from different manufacturers with notably different performance.

The storage system 102 may group the storage devices 106 for speed and/or redundancy using a virtualization technique such as RAID (Redundant Array of Independent/ Inexpensive Disks). The storage system 102 also includes one or more storage controllers 108.a, 108.b in communication with the storage devices 106 and any respective caches (not shown). The storage controllers 108.a, 108.b exercise low-level control over the storage devices 106 in order to execute (perform) data transactions on behalf of one or more of the hosts 104. The storage controllers 108.a, 108.b are illustrative only; as will be recognized, more or fewer may be used in various embodiments. Having at least two storage controllers 108.a, 108.b may be useful, for example, for failover purposes in the event of equipment failure of either one. The storage system 102 may also be communicatively coupled to a user display for displaying diagnostic information, application output, and/or other suitable data.

In the present example, storage controllers 108.a and 108.b are arranged as an HA pair. Thus, when storage controller 108.a performs a write operation for a host 104, storage controller 108.a also sends a mirroring I/O operation to storage controller 108.b. Similarly, when storage controller 108.b performs a write operation, it also sends a mirroring I/O request to storage controller 108.a. Additionally, while not shown with respect to FIG. 1, storage devices 106 each include at least two ports, A and B.

Each of the storage controllers 108.a and 108.b has at least one processor executing logic to dynamically change routing schemes based on monitored bandwidth use. In other words, each of the storage controllers 108 can process storage drive I/O operations using a combination of A and B ports and can dynamically change routing to the ports as appropriate. The particular techniques used in the writing and mirroring operations, as well as the routing schemes themselves, are described in more detail with respect to FIG. 2.

Moreover, the storage system 102 is communicatively coupled to server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is referred to as a singular entity, the server 114 may include any number of computing devices and may range from a single computing system to a system cluster of any size.

With respect to the hosts 104, a host 104 includes any computing resource that is operable to exchange data with a storage system 102 by providing (initiating) data transactions to the storage system 102. In an exemplary embodiment, a host 104 includes a host bus adapter (HBA) 110 in communication with a storage controller 108.a, 108.b of the storage system 102. The HBA 110 provides an interface for communicating with the storage controller 108.a, 108.b, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire. The HBAs 110 of the hosts 104 may be coupled to the storage system 102 by a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many embodiments, a host 104 may have multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., read, write, modify, etc.) remote data, a host HBA 110 sends one or more data transactions to the storage system 102. Data transactions are requests to read, write, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by reading, writing, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a Wide Area Network (WAN), and/or a Local Area Network (LAN). Fibre Channel and FCoE are well suited for embodiments where hosts 104 are coupled to the storage system 102 via a direct connection or via Fibre Channel switches. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CFIS, SAMBA, and NFS. A Network Attached Storage (NAS) device is a type of storage system that responds to file-level transactions. It is understood that the scope of present disclosure is not limited to either block-level or file-level protocols, and in many embodiments, the storage system 102 is responsive to a number of different memory transaction protocols.

In an embodiment, the server 114 may also provide data transactions to the storage system 102. Further, the server 114 may be used to configure various aspects of the storage system 102, for example under the direction and input of a user. Some configuration aspects may include definition of RAID group(s), disk pool(s), and volume(s), to name just a few examples.

Figure 2:
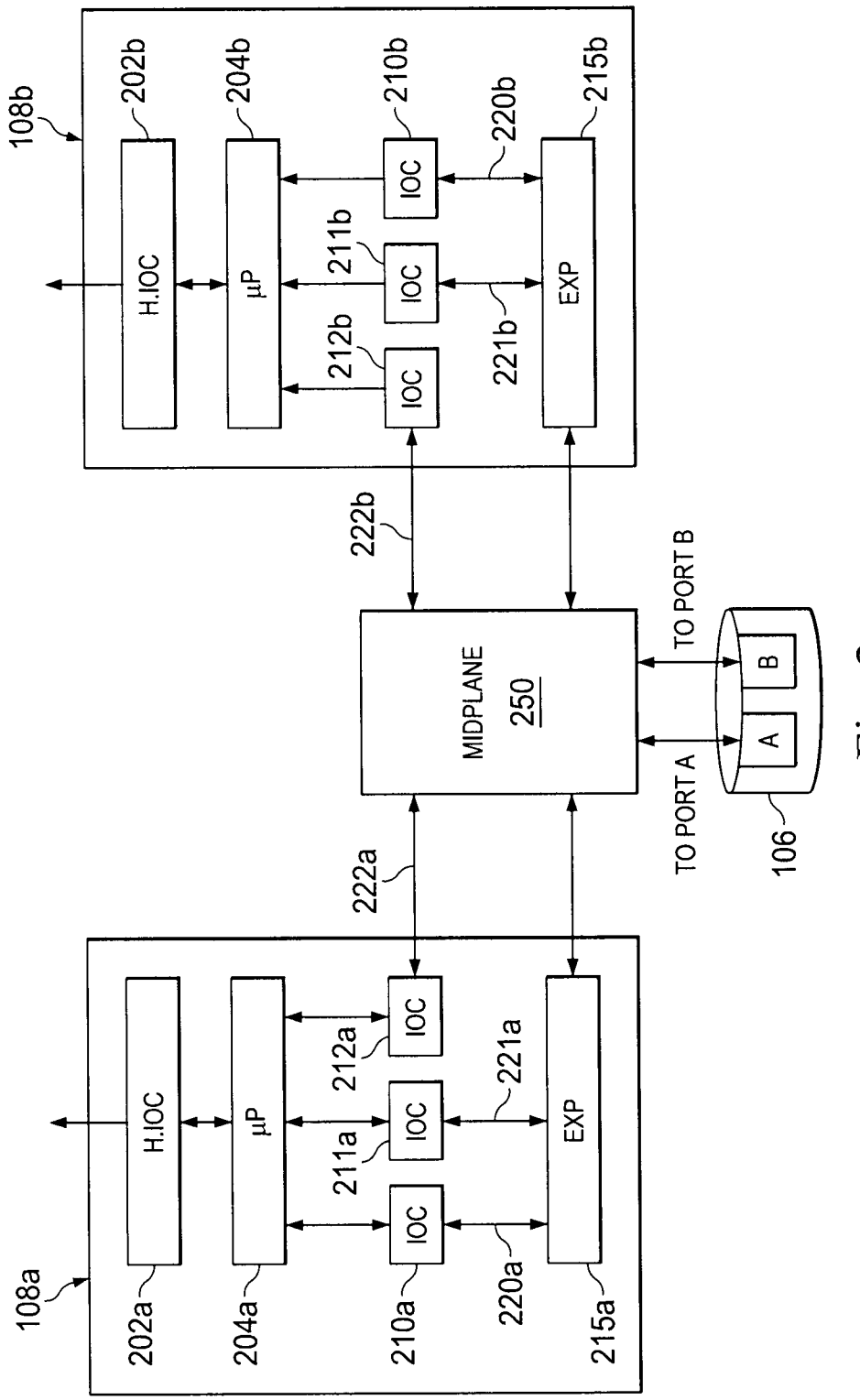
FIG. 2 is an organizational diagram of an exemplary controller architecture according to aspects of the present disclosure.

This is illustrated, for example, in FIG. 2 which is an organizational diagram of an exemplary controller architecture of a storage system 102 according to aspects of the present disclosure. The storage system 102 may include, for example, a first controller 108.a and a second controller 108.b, as well as the storage devices 106 (for ease of illustration, only one storage device 106 is shown). Various embodiments may include any appropriate number of storage devices 106. Furthermore, FIG. 2 shows storage device 106 having two ports, Side A and Side B. The storage devices 106 may include HDDs, SSDs, optical drives, and/or any other suitable volatile or non-volatile data storage medium.

Storage controllers 108.a and 108.b are redundant for purposes of failover, and the first controller 108.a will be described as representative for purposes of simplicity of discussion. It is understood that storage controller 108.b performs functions similar to that described for storage controller 108.a, and similarly numbered items at storage controller 108.b have similar structures and perform similar functions as those described for storage controller 108.a below.

As shown in FIG. 2, the first controller 108.a includes a host input/output controller (IOC) 202.a, a core processor 204.a, three storage input output controllers (IOCs) 210.a, 211.a, and 212.a. The storage IOCs are connected directly or indirectly to expander 215.a by communication channels 220.a and 221.a respectively. Storage IOC 212.a is connected directly or indirectly to midplane connector 250 by communication channel 222.a. Expander 215.a is connected directly or indirectly to midplane connector 250 as well.

The host IOC 202.a may be connected directly or indirectly to one or more host bus adapters (HBAs) 110 and provide an interface for the storage controller 108.a to communicate with the hosts 104. For example, the host IOC 202.a may operate in a target mode with respect to the host 104. The host IOC 202.a may conform to any suitable hardware and/or software protocol, for example including SAS, iSCSI, InfiniBand, Fibre Channel, and/or FCoE. Other suitable protocols include SATA, eSATA, PATA, USB, and FireWire.

The core processor 204.a may include a microprocessor, a microprocessor core, a microcontroller, an application-specific integrated circuit (ASIC), a central processing unit (CPU), a digital signal processor (DSP), a controller, a field programmable gate array (FPGA) device, another hardware device, a firmware device, or any combination thereof. The core processor 204.a may also be implemented as a combination of computing devices, e.g., a combination of a DSP and a microprocessor, a plurality of microprocessors, one or more microprocessors in conjunction with a DSP core, or any other such configuration.

The storage IOCs 210.a, 211.a, and 212.a provide an interface for the storage controller 108.a to communicate with the storage devices 106 to write data and read data as requested. For example, the storage IOCs 210.a, 211.a, and 212.a may operate in an initiator mode with respect to the storage devices 106. The storage IOCs 210.a, 211.a, and 212.a may conform to any suitable hardware and/or software protocol, for example including iSCSI, Fibre Channel, FCoE, SMB/CFIS, SAMBA, and NFS.

For purposes of this example, storage controller 108.a executes storage drive I/O operations in response to I/O requests from a host 104. Storage controller 108.a is in communication with Side A port of storage drive 106 via IOCs 210.a and 211.a, expander 215.a, and midplane 250. Thus, when storage controller 108.a routes an I/O operation to Side A port of storage drive 106, it uses either IOC 210.a or IOC 211.a.

Furthermore, storage controller 108.a is in communication with Side B port of storage drive 106 via IOC 212.a, midplane 250, and the internal routing of storage controller 108.b. In a default mode of operation, storage controller 108.a routes I/O operations to both ports A and B of storage drive 106 by using storage IOCs 210.a, 211.a, and 212.a. As noted above, using both ports of storage drive 106 allows for more efficient use of the storage drive 106.

During a write operation, storage controller 108.a performs the write I/O operation to storage drive 106 and also sends a mirroring I/O operation to storage controller 108.b. Storage controller 108.a sends the mirroring I/O operation to storage drive 108.b via IOC 212.a, communications channel 222.a, and midplane 250. Similarly, storage controller 108.b is also performing its own write I/O operations and sending mirroring I/O operations to storage controller 108.a via IOC 212.b, communications channel 222.b, midplane 250, and IOC 212.a. Therefore, during normal operation of the storage system 102, communications channel 222.a may be heavily used (especially by mirroring I/O operations) and not have any spare bandwidth. Additionally, storage drive I/O operations that are routed through communications channel 222.a may compete with the mirroring I/O operations thereon and cause those mirroring operations to be delayed.

Microprocessor 204.a executes code to provide functionality that dynamically routes I/O operations over channels 220.a, 221.a, and 222.a as appropriate to account for competition between storage drive I/O operations and mirroring operations. As noted above, in this example, the default operation is to route storage drive I/O operations to both ports A and B using channels 220.a, 221.a, and 222.a.

Microprocessor 204.a also monitors bandwidth use along one or more of those communications channels. As an example, microprocessor 204.a monitors a number of 512-byte data blocks transmitted on channel 220.a during a pre-defined time window and compares that rate of bytes per unit time against a bandwidth threshold. For instance, the bandwidth threshold may be set at 80% of a known bandwidth limit (in bytes per unit time) of communications channel 220.a.

Once microprocessor 204.a determines that the data traffic on communications channel 220.a exceeds the threshold, it changes to another routing table that moves the storage drive I/O operations away from communications channel 222.a. In this mode of operation, microprocessor 204.a routes the storage drive I/O operations to port A using IOCs 210.a and 211.a and communication channels 220.a and 221.a. In this manner, storage drive 108.a reserves IOC 212.a and communications channel 222.a for mirroring I/O traffic. Such mode of operation loses some efficiency by only using port A for storage drive I/O operations of storage controller 108.a, but it reduces the bandwidth use of communications channel 222.a, thereby reducing the delay for mirroring operations.

Microprocessor 204.a continually monitors the bandwidth use on a communication channel. In this example, it measures the bandwidth use on communications channel 220.a, though the scope of embodiments is not so limited. Rather, microprocessor 204.a may monitor the bandwidth use on any of the communications channels as appropriate.

Once microprocessor 204.a determines that the bandwidth use on communications channel 220.a has dropped below a second threshold (e.g., set at 55% of the known bandwidth limit of communications channel 220.a), it changes to another routing table that directs storage drive I/O operations to both ports A and B. This routing table conforms to the default operation, where microprocessor 204.a routes the storage drive I/O operations via storage IOCs 210.a, 211.a, and 212.a. Microprocessor 204.a continues to monitor the bandwidth use on one or more communications channels, compares that bandwidth use against thresholds, and applies routing tables based on that comparison. The scope of embodiments is not limited to any particular data structure for the routing tables, and they may include for example tables of entries specifying routing storage drive I/O operations to particular storage IOCs 210.a, 211.a, and 212.a and may be stored in any appropriate memory accessible by microprocessor 204.a.

The above description provides an illustration of the operation of microprocessor 204.a of storage controller 108.a. It is understood that storage controller 108.b performs similar operations. Specifically, in a default mode of operations, storage controller 108.b routes storage drive I/O operations to ports A and B using storage IOCs 210.b, 211.b, and 212.b. It continually monitors bandwidth on one or more of its communications channels (220.b, 221.b, and 222.b) and changes routing tables as appropriate based on one or more thresholds. Therefore, storage controller 108.b may reserve bandwidth on communications channel 222.b for mirroring I/O operations when bandwidth utilization is relatively high. Similarly, storage controller 108.b may utilize both ports of storage drive 106 when bandwidth use is relatively lower in order to gain efficiency of use of storage drive 106.

Figure 3:
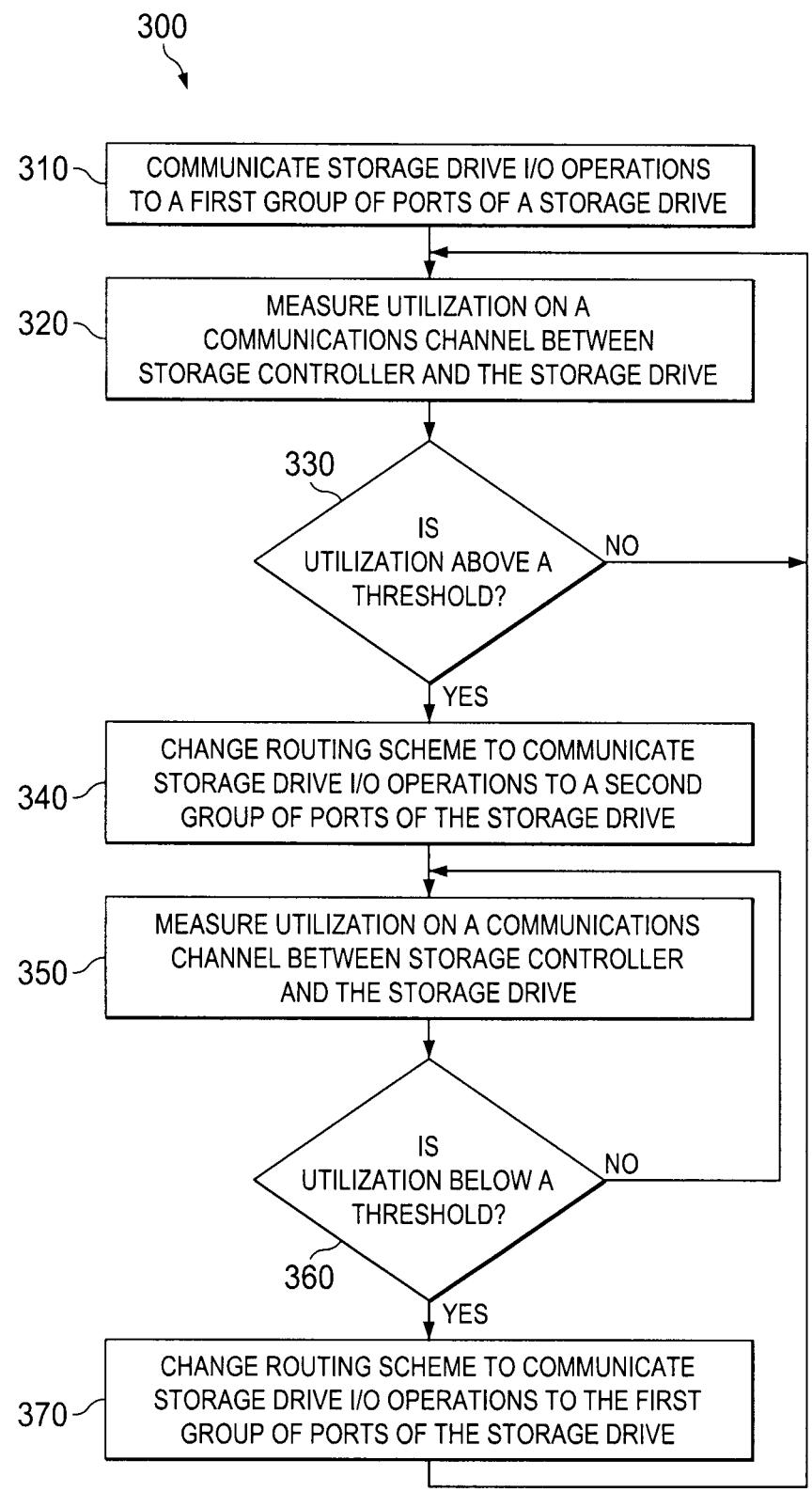
FIG. 3 is a flow diagram of a method of dynamically routing I/O operations according to aspects of the present disclosure.

Turning now to FIG. 3, a flow diagram of a method 300 of dynamically routing storage drive I/O operations is illustrated according to aspects of the present disclosure. In an embodiment, the method 300 may be implemented by one or more processors of one or more of the storage controllers 108 of the storage system 102, executing computer-readable instructions to perform the functions described herein. It is understood that additional steps can be provided before, during, and after the steps of method 300, and that some of the steps described can be replaced or eliminated for other embodiments of the method 300.

At action 310, the storage controller communicates storage drive I/O operations to a first group of ports of a storage drive. In the example of FIG. 2, storage controller 108.*a* communicates storage drive I/O operations to ports A and B of the storage drive 106. Thus, in the embodiment of FIG. 2, the first group of ports includes two ports per storage drive. However, it is understood that the scope of embodiments is not limited storage drives with two ports, nor is it limited to using only two storage drives. In fact, the first group of ports referred to in action 310 may include any appropriate number of ports.

At action 320, the storage controller measures utilization on a communications channel between the storage controller and the storage drive. Once again, referring to FIG. 2, the storage controller 108.*a* measures utilization on communications channel 220.*a*. The scope of embodiments includes measuring utilization on any component on the communications path to the storage drive. Furthermore, utilization may be measured in any appropriate way. In one example, utilization may be measured in terms of bytes per unit time, where there is a known maximum capacity in bytes per unit time, and utilization is a percentage of that maximum capacity.

At decision block 330, it is determined whether the measured utilization is above a threshold. For instance, a processing device of the storage controller may compare the measured utilization against a pre-defined threshold. The threshold may be set to any appropriate amount, and may be based for example on a value at which is expected that either storage drive I/O operations or mirroring operations might be negatively impacted. If the utilization is not above the threshold, the storage controller continues to measure the utilization. In some embodiments, the storage controller may measure utilization periodically or at other appropriate times.

If it is instead determined at decision block 330 that the utilization is above the threshold, then the storage controller changes its routing scheme to communicate storage drive I/O operations to a second group of ports of the storage drive. In the example of FIG. 2, the second group of ports of the storage drive includes only Side A and excludes Side B, at least from the perspective of storage controller 108.*a*. However, the scope of embodiments is not limited to any particular number or type of ports in the second group, as any appropriate group may be used. In some embodiments, action 340 may further include maintaining a same routing scheme for mirroring I/O operations or may include changing the routing scheme for mirroring I/O operations as well.

At action 350, the storage controller measures utilization on the communication channel again. Action 350 may include the same or similar actions as described above with respect to action 320.

At decision block 360, the storage controller determines whether utilization is below a threshold. The threshold at decision block 360 may be the same as or different than (e.g., lower than) the utilization threshold of decision block 330. If the determination at block 360 is NO, the storage controller continues to measure utilization at action 350. On the other hand, if the determination at decision block 360 is YES, then the storage controller changes the routing scheme to communicate storage drive I/O operations to the first group of ports of the storage drive at action 370. Thus, in this example, once utilization dips below the second threshold, the storage controller returns to the default operation of communicating the storage drive I/O operations to the first group of ports. In the example of FIG. 2, the default operation includes sending storage drive I/O operations to both ports of the storage drives until bandwidth utilization reaches a threshold level, and then reserving communication channels for mirroring operations. When bandwidth utilization decreases, then the system returns to the default mode of operation.

In some embodiments, action 370 may include changing a routing scheme for mirroring I/O operations, or maintaining a same routing scheme. Method 300 further includes measuring utilization at action 320.

The scope of embodiments is not limited to the actions shown in FIG. 3. Rather, other embodiments may add, omit, rearrange, or modify various actions. For instance, in a scenario wherein the storage controller is in an HA pair with another storage controller, the other storage controller may perform the same or similar method.

Figure 4:
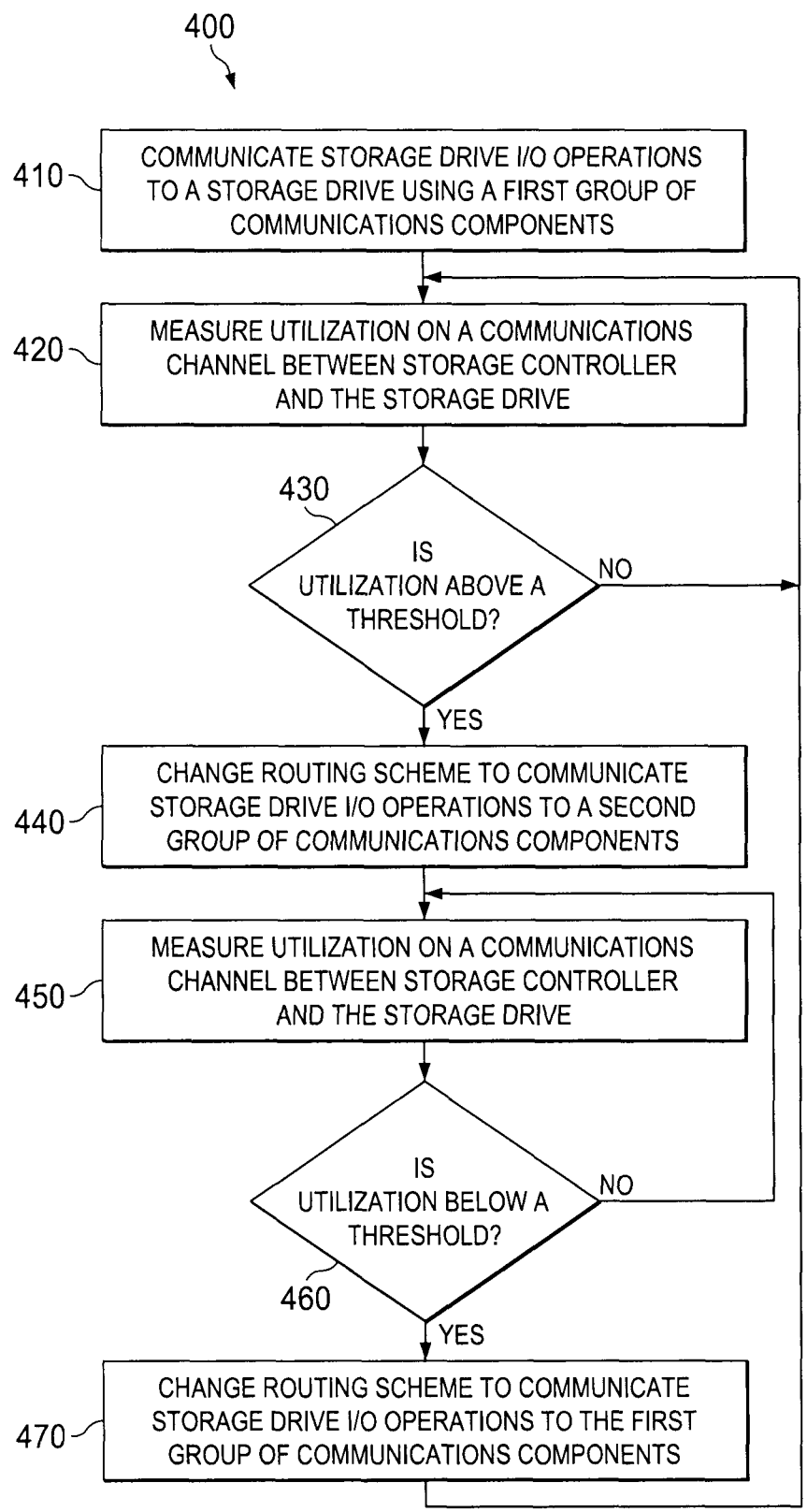
FIG. 4 is a flow diagram of a method dynamically routing I/O operations according to aspects of the present disclosure.

FIG. 3 illustrates one aspect of the dynamic routing technique of the present disclosure. FIG. 4 illustrates another aspect of the technique. Specifically, method 400 of FIG. 4 is from the perspective of a storage controller as it relates to the communication components rather than specifically to the ports of the storage drive. Nevertheless, the methods of FIG. 3 in FIG. 4 both describe the techniques performed in the system of FIG. 2.

The method 400 may be implemented by one or more processors of one or more of the storage controllers 108 of the storage system 102, executing computer-readable instructions to perform the functions described herein. It is understood that additional steps can be provided before, during, and after the steps of method 400, and that some of the steps described can be replaced or eliminated for other embodiments of the method 400.

At action 410, the storage controller communicates storage drive I/O operations to a storage drive using a first group of communications components. Referring to the example of FIG. 2, storage controller 108.*a* may in a default mode of operation communicate storage drive I/O operations to storage IOCs 210.*a*, 211.*a*, and 212.*a* and their corresponding communications channels 220.*a*, 221.*a*, and 222.*a*.

The actions of blocks 420 in 430 may be the same as or similar to the actions of blocks 320 and 330 of FIG. 3.

If the determination at decision block 430 is NO, then the storage controller continues to measure utilization at action 420. If the determination at decision block 430 is YES, then the storage controller changes the routing scheme to communicate the I/O operations to a second group of communications components at action 440. The second group of communications components is a different group of communications components than the first group, although there may be overlap in membership between the groups. For instance, in the example of FIG. 2, the first group includes storage IOCs 210.*a*, 211.*a*, and 212.*a* and their corresponding communications channels 220.*a*, 221.*a*, and 222.*a*, whereas the second group includes storage IOCs 210.*a* and 211.*a* as well as their corresponding communications channels 220.*a* and 221.*a* (omitting IOC 212.*a* and communications channel 222.*a*).

The method 400 continues at block 450, which may be the same as or similar to action 350 of FIG. 3. Similarly, the decision at block 460 may be the same as or similar to the decision at block 360 of FIG. 3. If the determination at block 460 is NO, the storage controller continues to measure utilization at block 450. If the determination at block 460 is YES, the method 400 moves to action 470, where the storage controller changes the routing scheme to communicate storage drive I/O operations to the first group of communications components. Method 400 continues by measuring utilization at action 420.

Of course, method 400 is not limited to the specific actions shown in FIG. 4. For instance, method 400 may further include changing or maintaining a routing scheme regarding mirroring I/O operations. Furthermore, while methods 300 and 400 are directed to changing a routing scheme of storage drive I/O operations, the concepts of methods 300 and 400 may be applied to routing schemes for mirroring I/O operations. For instance, another embodiment includes measuring utilization against a threshold and then changing a routing scheme for mirroring I/O operations to use either a different group of communications components or different ports of storage drives.

Also, while methods 300 and 400 are described with respect to a single storage drive, it is understood that the scope of embodiments may be applied to storage arrays, using multiple storage drives, and that the storage drive I/O operations and mirroring I/O operations may be directed to a multitude of storage drives in a storage array.

Additionally, while methods 300 and 400 are described with respect to having a default operation including using both ports of the pair of ports or a first group of communication components that is more inclusive than a second group of communications components, the scope of embodiments includes using any operating mode as a default mode and changing a routing scheme to use a different mode. For instance, in another embodiment, the storage controller may have a default mode that includes using only one port of the pair of ports of the storage drive and may switch to using both ports of the pair of ports in response to measuring utilization.

Various embodiments described herein provide advantages over prior systems and methods. For instance, a conventional system that routes storage drive I/O operations to both ports of storage drives regardless of bandwidth use may unnecessarily delay mirroring operations. Similarly, a conventional system that routes storage drive I/O operations only to one port of the storage drive may not take full advantage of efficiency of the storage drive, especially in SSD embodiments. Various embodiments described above use a dynamic routing scheme to take advantage of multiple ports of the storage drives when appropriate and to reserve communications channels for some of the I/O operations (e.g., mirroring I/O operations) when appropriate. Various embodiments improve the operation of the storage system 102 of FIG. 1 by increasing the efficiency of the storage drives and by reducing or minimizing delay associated with mirroring I/O operations. Put another way, some embodiments are directed toward a problem presented by the architecture of some storage systems, and those embodiments provide dynamic routing techniques that may be adapted into those architectures to improve the performance of the machines used in those architectures.

The present embodiments can take the form of an entirely hardware embodiment, an entirely software embodiment, or an embodiment containing both hardware and software elements. In that regard, in some embodiments, the computing system is programmable and is programmed to execute processes including the processes of methods 300 and 400 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
communicating input output (I/O) operations between a first storage controller and a storage drive, wherein the storage drive includes a first port and a second port, further wherein the first storage controller accesses the second port of the storage drive via a second storage controller;
measuring bandwidth utilization on a first channel of a plurality of channels between the first storage controller and the storage drive; and
in response to the measured bandwidth utilization exceeding a first threshold, changing a routing scheme for the I/O operations by stopping routing the I/O operations to the second port of the storage drive.

2. The method of claim 1, wherein changing the routing scheme comprises:
beginning routing the I/O operations to the second port of the storage drive in response to determining that bandwidth utilization falls below a second threshold.

3. The method of claim 2, wherein the first threshold is higher than the second threshold.

4. The method of claim 1, wherein communicating I/O operations comprises:
routing some of the I/O operations from a first input output controller (IOC) to the first port of the storage drive, and routing others of the I/O operations from a second IOC to the second port of the storage drive.

5. The method of claim 4, wherein changing a routing scheme for the I/O operations comprises:
stopping routing storage drive I/O operations from the second IOC to the second port of the storage drive; and
routing mirroring I/O operations from the second IOC to the second port of the storage drive.

6. The method of claim 1, wherein the first storage controller and the second storage controller are arranged as a redundant high availability (HA) pair, further wherein the storage drive is part of an array of storage drives controlled by the HA pair.

7. A computing device, comprising:
a memory containing machine readable medium comprising machine executable code having stored thereon instructions for performing a method of dynamically routing storage operations; and a processor coupled to the memory, the processor configured to execute the machine executable code to:
- communicate I/O operations from a first storage controller to a storage array via a first group of communication components according to a first routing scheme, the first group of communication components providing a first communication channel to the storage array via a second storage controller;
- measure utilization of at least one of the first group of communication components; and
- in response to the measured utilization exceeding a first threshold, change to a second routing scheme that includes communicating the I/O operations via a second group of communication components and reserving the first communication channel for mirroring I/O operations.

8. The computing device of claim 7, wherein the first group of communications components includes a first group of input output controllers and respective communication channels in communication with multiple ports of each storage drive of the storage array, and wherein the second group of communications components omits one or more input output controllers and communication channels from the first group.

9. The computing device of claim 8, wherein the storage array includes a plurality of storage drives, each of the storage drives having a pair of ports, further wherein:
- the first routing scheme includes routing storage drive I/O operations to both ports of the pair of ports for a given one of the storage drives; and
- the second routing scheme includes routing storage drive I/O operations to only one of the ports of the pair of ports of the given one of the storage drives.

10. The computing device of claim 8, wherein measuring utilization comprises:
- measuring bytes per unit time of a communication channel between the first storage controller and the storage array.

11. The computing device of claim 7, wherein the processor is further configured to:
- not change a routing scheme for mirroring I/O operations in response to the measured utilization exceeding the first threshold.

12. The computing device of claim 7, wherein the computing device includes the first storage controller, further wherein the first storage controller is in a redundant high availability (HA) pair with a second storage controller.

13. The computing device of claim 12, wherein the processor is configured to:
- according to the first routing scheme, communicate ones of the I/O operations that are storage drive I/O operations over the first communication channel to the second storage controller; and
- according to the second routing scheme, not communicate the storage drive I/O operations over the first communication channel to the second storage controller.

14. The computing device of claim 7, wherein the processor is further configured to execute the machine executable code to, in response to the measured utilization falling below a second threshold, change back to the first routing scheme, the second threshold being lower than the first threshold.

15. A non-transitory machine readable medium having stored thereon instructions for performing a method of dynamically routing read and write operations to a storage array, comprising machine executable code which when executed by at least one machine, causes the machine to:
- implementing a first routing scheme that includes:
  - routing storage drive I/O operations from a first storage controller to the storage array via a first communication channel; and
  - routing mirroring I/O operations from the first storage controller to a second storage controller via the first communication channel;
- measuring a utilization of either the first communication channel or another communication channel of the first storage controller; and
- in response to the measured utilization exceeding a first pre-defined threshold of utilization, implementing a second routing scheme that includes:
  - routing the storage drive I/O operations from the first storage controller to the storage array via a second communication channel and not via the first communication channel; and
  - routing the mirroring I/O operations from the first storage controller to the second storage controller using the first communication channel.

16. The non-transitory machine readable medium of claim 15, wherein the first routing scheme includes:
- routing the storage drive I/O operations to the storage array by routing to both ports of port pairs of storage drives of the storage array.

17. The non-transitory machine readable medium of claim 16, wherein the second routing scheme includes:
- routing the storage drive I/O operations to the storage array by routing to only one port of port pairs of storage drives of the storage array.

18. The non-transitory machine readable medium of claim 17, wherein the first storage controller and the second storage controller are coupled in a redundant high availability (HA) pair to control the storage array.

19. The non-transitory machine readable medium of claim 15, comprising further machine executable code that causes the machine to:
- subsequent to implementing the second routing scheme, repeating measuring the utilization; and
- in response to a subsequent measurement of the utilization being below a second pre-defined threshold of utilization, changing the routing scheme to implement the first routing scheme.

20. The non-transitory machine readable medium of claim 19, wherein the second pre-defined threshold of utilization is lower than the first pre-defined threshold of utilization.

* * * * *